United States Patent [19]

Langenfeld et al.

[11] 4,431,207
[45] Feb. 14, 1984

[54] AUTOMATIC HITCH DEVICE

[75] Inventors: Joseph W. Langenfeld; Neal W. Westendorf, both of Onawa, Iowa

[73] Assignee: Westendorf Manufacturing Company, Inc., Onawa, Iowa

[21] Appl. No.: 335,860

[22] Filed: Dec. 30, 1981

[51] Int. Cl.³ .............................................. B60D 1/04
[52] U.S. Cl. ................................ 280/415 A; 280/515; 280/479 A; 172/248
[58] Field of Search ........... 280/515, 508, 507, 479 R, 280/479 A, 415 R, 415 A, 461 A; 403/229; 172/248

[56] References Cited

U.S. PATENT DOCUMENTS

| | | | |
|---|---|---|---|
| 2,254,566 | 9/1941 | Cornell | 403/229 |
| 2,635,890 | 4/1953 | Schwartz | 280/508 |
| 2,983,523 | 5/1961 | Kienzle | 280/479 A |
| 4,015,855 | 4/1977 | Murray | 280/515 |

FOREIGN PATENT DOCUMENTS 55336 10/1943 Netherlands ........................ 280/515

Primary Examiner—John A. Pekar
Assistant Examiner—D. Lynn Fugate
Attorney, Agent, or Firm—Zarley, McKee, Thomte, Voorhees & Sease

[57] ABSTRACT

An automatic hitch device for use on a tractor with a three-point hitch is disclosed. The device allows a tractor operator to engage or disengage a tow vehicle without leaving the tractor. Two fail-safe mechanisms are disclosed which prevent inadvertent disengagement of the tow vehicle. Structure for transmitting the towing load to the tractor drawbar is described. A hydraulic cylinder is used to operate a hitch pin. An alignment spring which helps direct the hitch pin into the tow vehicle hitch also relieves lateral force on the hydraulic cylinder. Co-operation between the fail-safe mechanisms and manual disengagement of the fail-safe mechanisms are also described.

11 Claims, 7 Drawing Figures

AUTOMATIC HITCH DEVICE

BACKGROUND OF THE INVENTION

The present invention relates generally to hitching devices and more particularly to a hitching device that may be mounted on a three-point hitch of a farm tractor.

The use of prime movers to pull wagons, plows and other farm implements is well understood. The use of high powered farm tractors in the past century has allowed operators to pull heavy vehicles and perform many operating functions through the use of hydraulic power systems. However, the method of hitching a tow vehicle to a prime mover has remained relatively unchanged since the days of horse drawn wagons. When a vehicle is to be hitched to a tractor, it is necessary for the operator to back the tractor near the tongue of the tow vehicle, dismount from the tractor, raise the tongue of the tow vehicle to the drawbar of the tractor and, if the tractor has been properly positioned, attach the tongue to the tractor drawbar. If the operator has misjudged the distance between the tongue and the tractor drawbar, it is necessary to move the tractor and again repeat the operation. It would be generally desirable to provide an automatic hitch device which allows an operator to engage or disengage the tongue of the tow vehicle without leaving the cab of the tractor. The present invention is directed toward that application.

SUMMARY OF THE INVENTION

The present invention is an automatic hitch device adapted for mounting on a conventional three-point hitch of a farm tractor. The device has a hitch pin mounted on a hydraulic cylinder unit which may be extended and retracted to engage or disengage the hitch on a tow vehicle tongue. The hitch pin apparatus is mounted on a structure which may be raised or lowered by the three-point hitch. The device may therefore be lowered to a position that allows the hitch pin to be inserted in a tow vehicle tongue hitch. The automatic hitch device is provided with a draw-bar pin which is adapted to engage the tractor drawbar when the device is raised. The drawbar hitch pin transmits the pulling force exerted by the tow vehicle directly to the drawbar thus effectively eliminating any longitudinal force placed on the three-point hitch during towing. A vertical spring mounted between the hitch pin and the hydraulic cylinder allows the hitch pin to be displaced laterally. This feature allows the pin to adjust as it engages a hitch without producing bending torque in the rod of the hydraulic cylinder. The hitch pin is provided with a neck to prevent it from dropping through the hole in the hitch even if the spring or control rod were to break. A safety clevis is provided which engages a half rim mounted on the upper surface of the tow vehicle tongue. The safety clevis keeps the tow vehicle engaged to the automatic hitch device even if the hitch pin were to break or be accidentally retracted by the tractor operator. The safety clevis is automatically disengaged when the automatic hitch device is lowered to the ground with the three-point hitch. A second safety device is provided which prevents the entire hitch apparatus from being inadvertently lowered from its raised position. The second safety device consists of a retractable tab which is positioned on the automatic hitch device above the drawbar of the tractor. If a tractor operator accidently pushes the hydraulic control to lower the three-point hitch, the safety tab will prevent it. The safety tab may be raised by raising the hitch pin on the hydraulic cylinder unit. Thus, in order for the tow vehicle to be disengaged from the tractor once it is in the tow position, it is necessary for the tractor operator to first raise the hitch pin and then lower the automatic hitch device to the ground. Accidental bumping of either the hitch pin control or the three-point hitch control will not cause the wagon to be disengaged. To further ensure safety, the two controls are connected so that the one lever must be pushed and the other lever must be pulled to disengage the tow vehicle. With this arrangement the tow vehicle would not be disengaged even if the tractor operator were to fall forward against both control levers. The safety devices may be easily disengaged manually so that if a tractor cannot be started, it is a simple matter to manually disengage the safety devices and the hitch pin to allow connection of the tow vehicle to another tractor.

Accordingly, it is an object of the present invention to provide an automatic hitch device which allows a tractor operator to engage or disengage a tow vehicle without leaving the cab of the tractor.

It is a further object of the present invention to provide an automatic hitch device which may be mounted on the three-point hitch of a prime mover.

It is a further object of the present invention to provide an automatic hitch device which has multiple safety devices which prevent a tow vehicle from being accidentally unhitched.

It is a further object of the present invention to provide an automatic hitch device which uses a hitch pin which is self-aligning and which reduces bending torque on a hydraulic cylinder.

It is a further object of the present invention to provide an automatic hitch device which uses a hydraulic cylinder equipped with a pressure sensing means to prevent damage to the cylinder or a tow vehicle tongue.

It is a further object of the present invention to provide an automatic hitch device which is constructed in components for easy shipping.

DESCRIPTION OF THE PREFERRED EMBODIMENT

Figure 1:
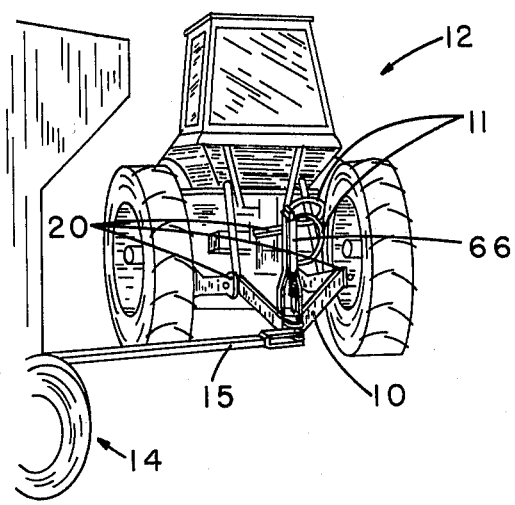
FIG. 1 is a perspective view of a tractor mounted with an automatic hitch device pulling a wagon.

It may be seen from FIG. 1 that the automatic hitch device of the present invention 10 is adapted for mounting on the three-point hitch of a prime mover, such as a conventional farm tractor 12. The three-point hitch 20 is hydraulically operated and may be raised or lowered by manipulation of a control lever (not shown) mounted in the tractor cab. Motive power for the hydraulic cylinder 66 is provided by fluid from the tractor's hydraulic system supplied by hydraulic lines 11. A control lever for the hydraulic cylinder 66 is also mounted in the cab of the tractor 12.

The structure of the invention will now be described with reference to FIGS. 2 through 7. As shown most clearly from FIG. 7, the main frame of the automatic hitch device is a transverse member 40 consisting of a horizontal trunk piece 41 and two upwardly inclining branch pieces 42. The trunk and branch pieces 41, 42 are high strength structural members, such as channel iron or the like and are connected by weldment. Pivot rods 44 are attached to the outboard ends of the transverse member 40 by weldment or other rigid attachment means well known in the art and allow the transverse member 40 to be pivotally mounted on the lower arms 22 of the three-point hitch 20. Quick pins 46 may be inserted to retain the transverse member on the lower arms 22 and a screw-on cap 26 may be provided to prevent damage or bending of the rods 44. A tow bar 47 is attached to the lower surface of the trunk piece 41 by weldment, brackets, or other conventional attachment means well known in the art. The tow bar 47 is provided with a hole 48 at the rearward end adapted to accept a hitch pin 50, as described in further detail below. A spike 49 adapted to engage the tractor drawbar 13 is mounted on the upper surface of the tow bar 47 at its forward end.

Figure 7:
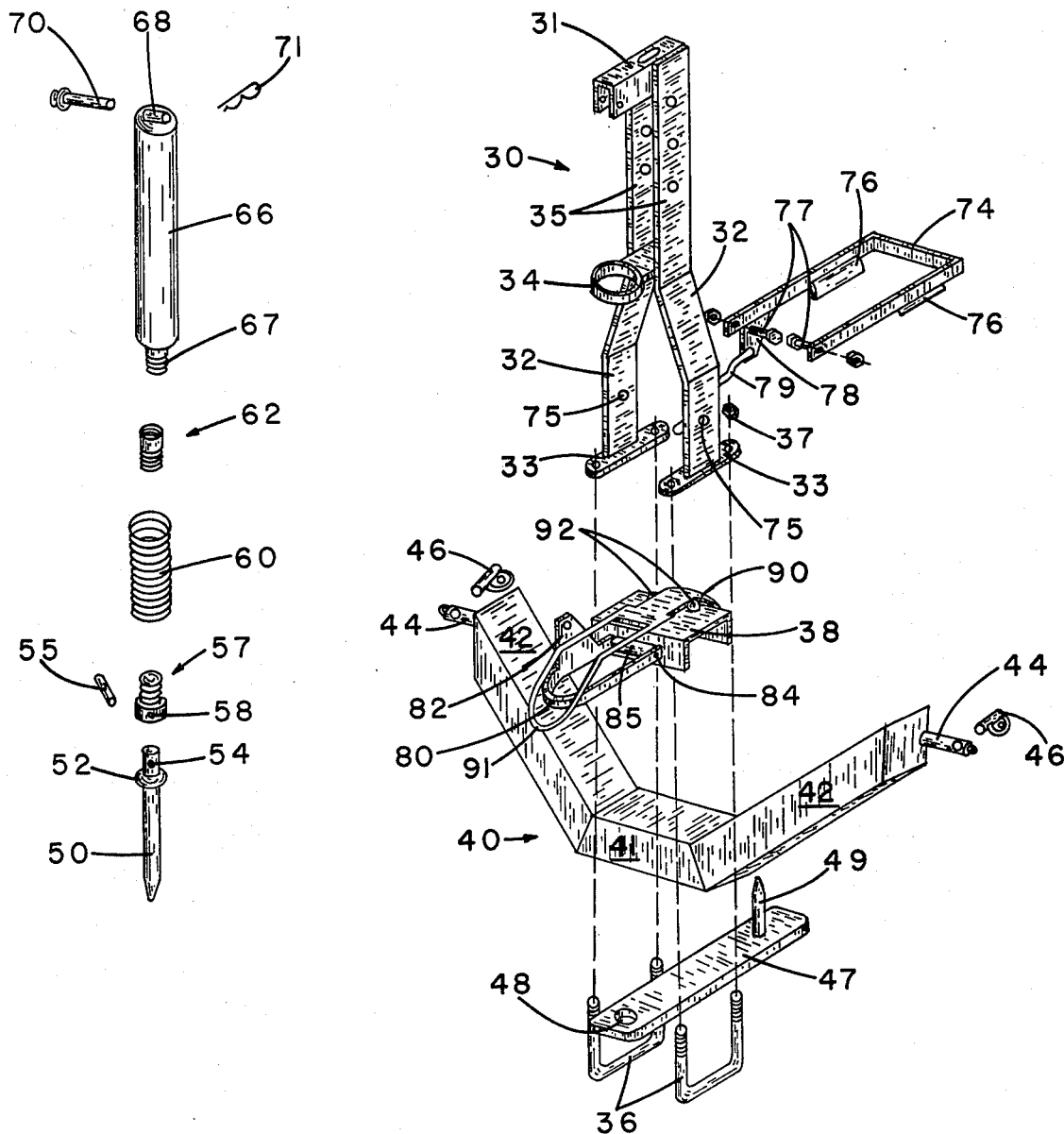
FIG. 7 is an exploded perspective view of an automatic hitch device.

A tower 30 used for supporting the hydraulic cylinder 66 is mounted on the upper surface of the trunk piece 41. In the preferred embodiment the tower 30 is formed from two vertical metal bars 35 welded together in spaced apart position. The lower portion of both bars are bent outward to form tower legs 32, as shown by FIG. 7. Base shoes 33 with eyelets are welded to the bottom of each tower leg 32 and allow the tower to be removably attached to the trunk piece 41 with U-bolts 36 and nuts 37. A horizontal tower arm 31 is welded to the top of the tower and is provided with holes to allow attachment of the hydraulic cylinder 66. A cylinder sleeve 34 is welded to the tower 30 immediately below the tower arm 31 and is adapted to accept the cylinder body 66. As shown by FIG. 7, the cylinder 66 is provided with a sleeve 68, pivot pin 70 and cotter pin 71 for removable attachment to the tower arm 31. A cylinder rod 67 is threaded to allow mating with cylinder-spring connector 62. The connector 62 is a metalic cylinder which is tapped at its upper end and threaded at its lower end. The threaded end accommodates connection with a tightly coiled spring 60. A pin-spring connector 57 is similarly threaded at its upper end and mates with the lower end of the spring 60. A hole (not shown) provided in the lower end of the pin-spring connector 57 accepts the upper end of hitch pin 50. A transverse hole in the hitch pin 50 may be axially aligned with transverse connector hole 58. A roll pin 55 is used to removably attach the hitch pin 50 to the connector 57. A pin collar 52 is provided which is larger than the hole 18 in a tow-vehicle hitch 16. Thus, even if the pin 50 becomes disengaged from the pin-spring connector 57, it will remain in the hitch 16, thereby preventing disengagement of the tow vehicle 14. The collar 52 also engages a tab loop 91, as described in further detail below.

Figure 2:
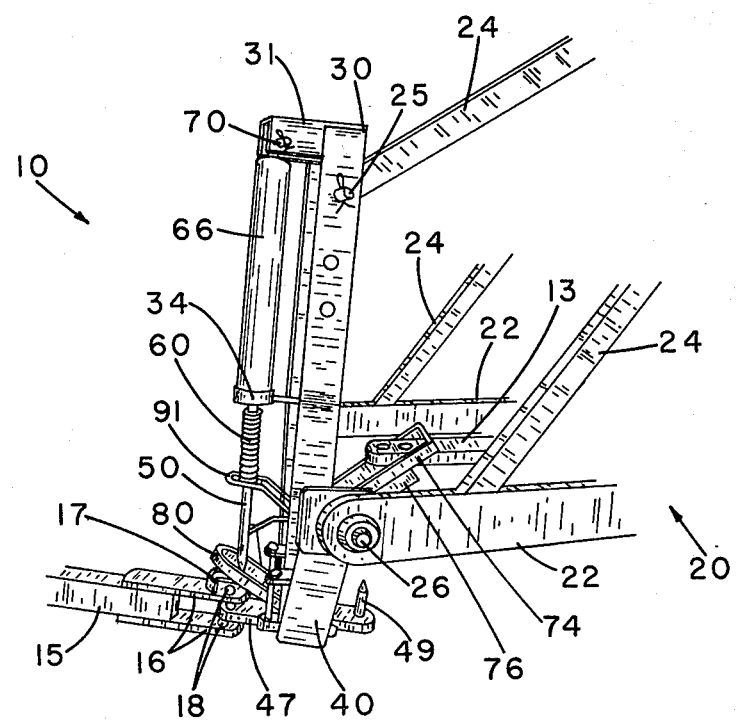
FIG. 2 is a perspective side view of an automatic hitch device positioned to engage a wagon tongue.
Figure 3:
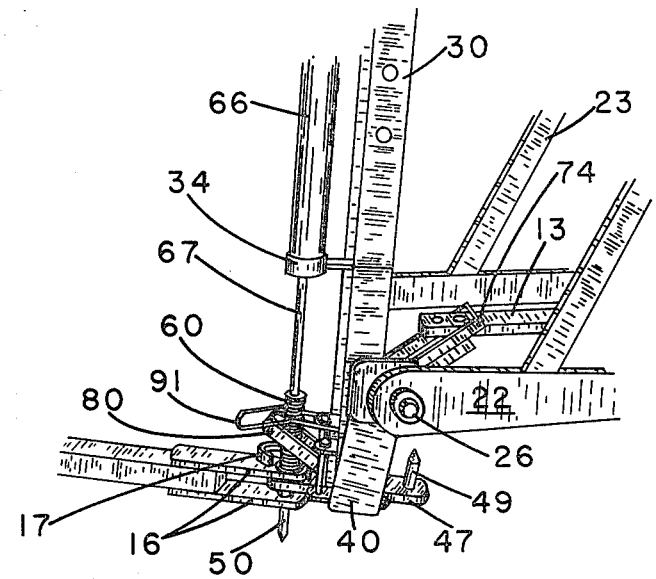
FIG. 3 is a perspective side view of an automatic hitch device in a lowered position with a wagon tongue engaged.
Figure 4:
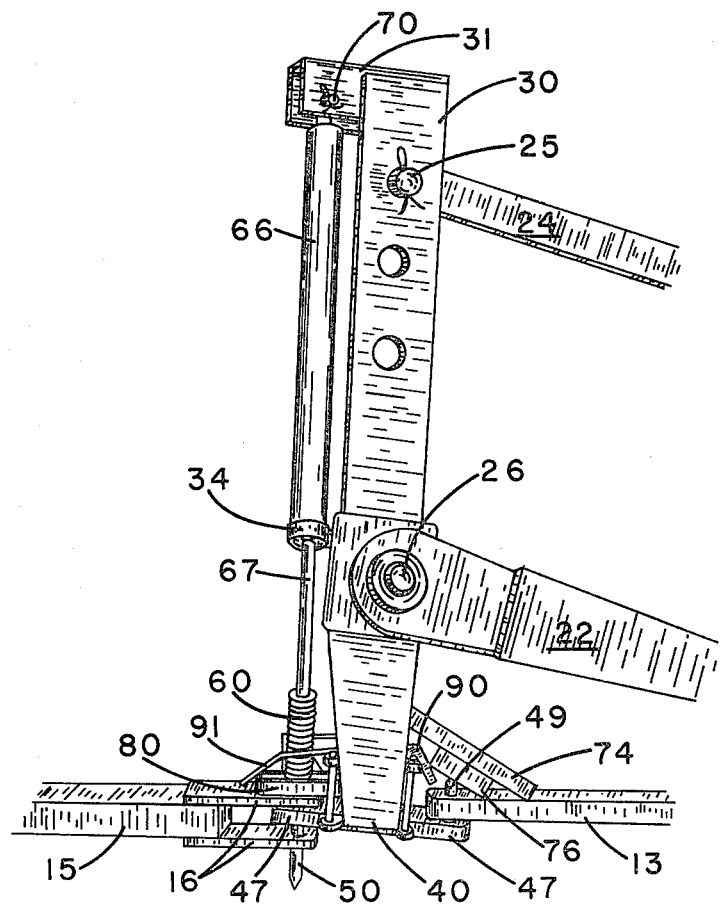
FIG. 4 is a perspective side view of an automatic hitch device in a raised position with a wagon tongue engaged.
Figure 5:
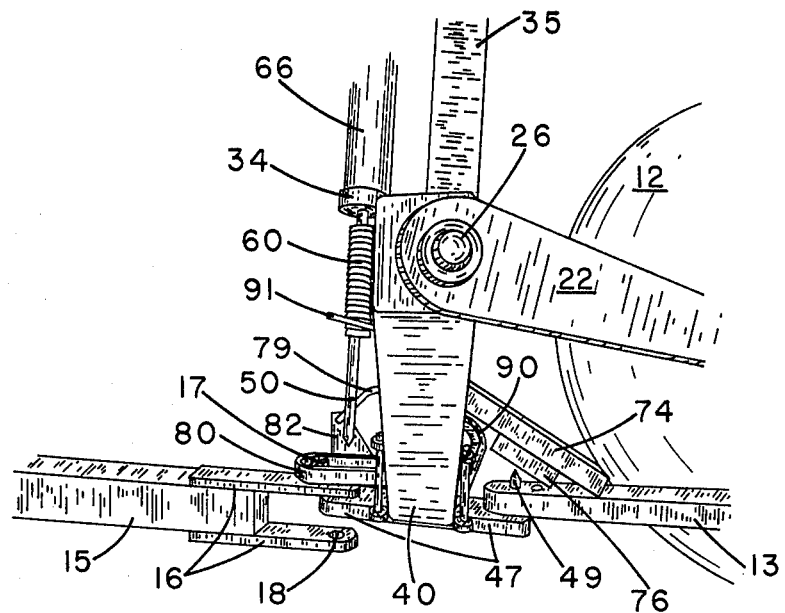
FIG. 5 is a perspective side view of an automatic hitch device in a raised position with a wagon tongue engaged by a safety clevis.

The primary hitching operations of the present invention will now be described. The structure and operation of additional features will be explained later. As shown by FIGS. 2 and 4, the automatic hitch device 10 is mounted on the lower member of the three-point hitch 20 and is maintained in a vertical position by the three-point hitch upper arm 24 which is pivotally attached to the upper portion of the tower 30 by means of a pin 25. The automatic hitch device 10 is raised and lowered by raising or lowering the three-point hitch 20. When the tongue hitch 16 of a tow vehicle 14 is to be engaged, the three-point hitch 20 is lowered to a position where the towbar 47 is at an elevation between the two prongs of the tongue hitch 16. The tractor 12 is then driven backwards to position the towbar hole 48 in co-axial alignment with the tongue hitch holes 18. The cylinder rod 67 is then extended by actuation of a control lever (not shown) in the tractor cab. As shown by FIG. 3, the hitch pin 50 penetrates the three holes 18, 48 to pivotally engage the tow vehicle tongue 15. As the hitch pin 50 descends it is frequently not centered directly above the upper tongue hole 18. However, flexibility of the spring 60 allows the tip of the pin 50 to be displaced laterally and thereby directed into the hole 18. The lateral flexibility of the spring 60 also prevents it from transmitting bending forces which might damage the cylinder rod 67. In the preferred embodiment, a valve system (not shown) is used which restricts the flow rate of hydraulic fluid to the cylinder 66, thereby reducing the speed of extention or retraction of the cylinder rod 67 to a few inches per second. A pressure sensing valve (not shown), well known in the art, is also employed to prevent the hitch pin 50 from being driven against an unyielding surface, such as the surface of the hitch 16 or an underlying rock. As shown in FIG. 4, the automatic hitch device 10 may be raised by the three-point hitch 20, thereby causing the tow bar spike 49 to slideingly engage a hole in the tractor drawbar 13. This arrangement allows all of the lateral pulling force exerted on the device 10 to be transmitted directly to the drawbar 13, rather than the three-point hitch 20. As shown by FIG. 5, the tow vehicle hitch 16 is disengaged from the draw pin 50 by retracting the cylinder rod 67.

The structure and operation of two safety devices will now be described. As shown in FIG. 7, a U-shaped shoe plate 38 is positioned over the top of the trunk piece 41 and held in place by the tower base shoes 33 and U-bolts 36. A clevis 80 with a clevis knuckle 82 is hinged to a sleeve 84 next to the lateral rear surface of the shoe plate 38. the clevis swings vertically about the pivot pin 85. It may also be seen from FIG. 7 that a U-shaped drawbar trip piece 74 is pivotally attached to holes 75 in tower legs 32 by means of bolts 77. A trip knuckle 78 is positioned near the point of pivotal attachment to the tower leg 32 and is longitudinally aligned with the clevis knuckle 82. A linkage rod 79 is pivotally attached to each knuckle 78, 82 thereby transferring displacement of the trip 74 to the clevis 80. It may be seen that counterclockwise rotation of the trip 74 will cause the clevis 80 to rotate in a clockwise direction. Stated somewhat differently, a vertical displacement of the free end of the trip 74 will be mirrored by the free end of the clevis 80. As shown by FIGS. 2 through 7, the trip 74 is provided with alignment wings 76 which slidingly engage the tractor drawbar 13. The wings 76 eliminate rattling that might be produced by vibration of the tractor 12. It may be seen from FIGS. 3 through 6 that the transverse portion of the trip 74 is in constant contact with the drawbar 13, thus causing the trip 74 to swing up or down as the three-point hitch 20 is lowered and raised. It may be seen from FIG. 2 that a semi-circular piece of metal 17 conforming to the curvature of the end of the clevis 80 is welded or otherwise rigidly attached to the upper surface of the tow vehicle hitch 16 at a position which allows the clevis 80 to swing down and enclose it. As illustrated by FIG. 2, when the three-point hitch is lowered, the free end of the trip 74 is caused to swing upward by its sliding contact with the drawbar 13. The upward displacement of the trip 74 is mirrored by the clevis 80 which is similarly displaced to a raised position. As illustrated by FIG. 4, when the three-point hitch 20 is raised, the free end of the trip 74 is displaced downward thereby allowing the free end of the clevis 80 to rotate downward and encompass the half round 17. The clevis 80 acts as a safety latch which will hold the tow vehicle tongue 15 on the towbar 47, even if the hitch pin 50 is inadvertently disengaged, as illustrated in FIG. 5. To disengage the tongue 15, it is necessary to first disengage the hitch pin 50 by retracting the cylinder rod 67 and thereafter to lower the three-point hitch 20 to disengage the clevis 80 from the half round 17. If the hydraulic system is designed so that the two control levers (not shown) must be moved in opposite directions to perform these functions, then the wagon 14 will not be disengaged even if a person falls against both control levers at the same time.

Figure 6:
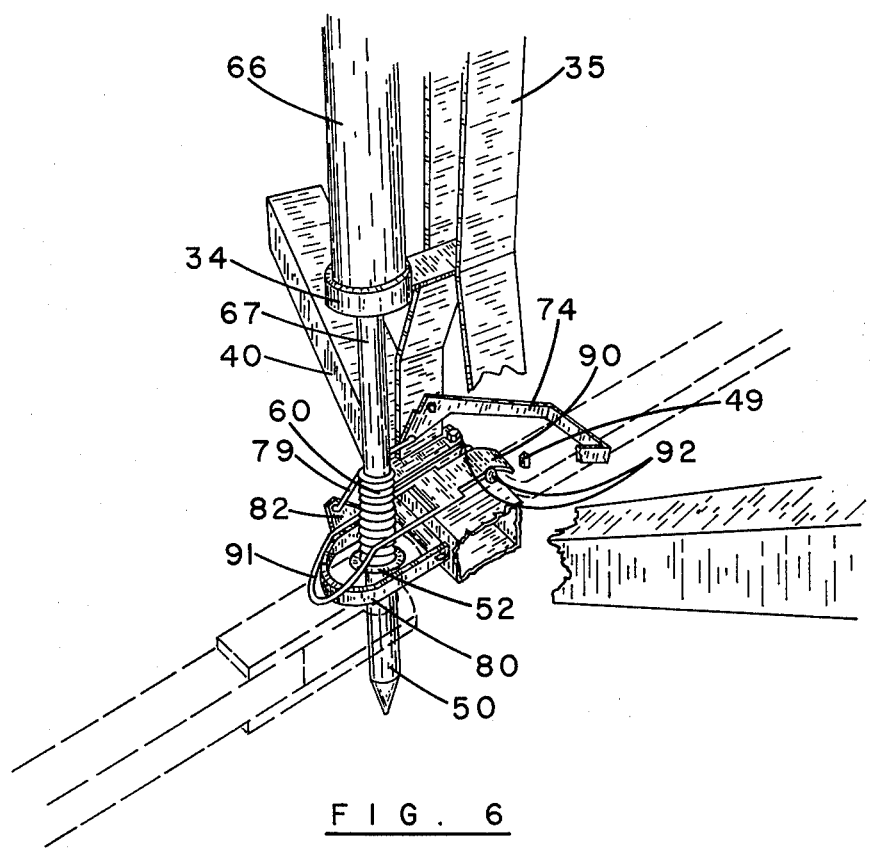
FIG. 6 is a cutaway detail perspective view of an automatic hitch device with a wagon tongue engaged.

As shown by FIGS. 6 and 7, a tab 90 which extends out over the drawbar 48 is pivotally mounted to ears 92 on the upper surface of shoe plate 38. The tab 90 is rigidly attached to a metal loop 91 which is sufficiently wide so as not to make contact with the spring 60. The loop 91 is sufficiently narrow so as to be engaged by the collar 52 of the hitch pin 50. The loop 91 extends out over clevis 80 and is supported by the upper surface of the clevis 80, as shown in FIGS. 3, 4 and 6 except when it is engaged by the hitch pin collar 52, as shown in FIGS. 2 and 5. It may be seen with reference to FIGS. 4, 5 and 6 that sufficient clearance exists between the end of the tab 90 and the tractor drawbar 13 when the device 10 is in the raised position to allow the tab to pivot from a position extending over the drawbar 13 to a position folded back against the transverse member 40. Referring now to FIG. 2, it will be seen that when the automatic hitch apparatus 10 is positioned to engage a hitch 16, the tab loop 91 is raised by the pivot pin 50, thereby holding the tab 90 against the transverse member 40. As shown by FIG. 3, even after the pin 50 has been inserted into position, the tab loop 91 remains in a raised position on the surface of the clevis 80, but is gradually lowered as the device 10 is raised with respect to the drawbar 13. In the preferred embodiment, there is sufficient clearance between the tab 90 and the drawbar so that no contact is made with the drawbar as the tab 90 is slowly rotated outward. However, it may be seen from the orientation of the tab 90 that even if it were to contact the lower surface of the drawbar 13, the curving upper surface of the tab 90 would cause it to fold back until it had cleared the drawbar 13, at which point it would swing into the position illustrated in FIG. 4. The position of tab 90 immediately above the drawbar prevents the automatic hitch device 10 from being lowered with respect to the drawbar by an inadvertent movement of the three-point hitch 20 control lever. The hydraulic cylinders (not shown) which control the three-point hitch are equipped with a pressure sensing device well known in the art, which would prevent any further displacement of the three-point hitch 20 once the tab 90 came into contact with the drawbar 13. In order to lower the automatic hitch device 10 with respect to the drawbar 13, it is necessary for an operator to first raise the hitch pin 50 which raises the loop 91 and folds the tab 90 back against the transverse member 40. The three-point hitch control lever may then be used to lower the device 10 with respect to the drawbar 13.

From the above, it may be seen that the tab 90 and clevis 80 co-act to ensure that the tow vehicle 14 is not accidentally disengaged from the tow bar 48. The tab 90 and the clevis 80 also co-act to ensure that the automatic hitch device 10 is not accidentally disengaged from the drawbar 13. It is necessary to operate tow control levers in sequence in order to disengage the tow vehicle 14 or to disengage the tow bar 48. It may also be seen from the above description that the trip lever 74 or loop 91 may be raised manually by a person standing next to the device 10. Thus, if it were desired to disengage a wagon without operating the hydraulic system of the tractor 12, the safety devices could be disengaged manually and the hitch pin 50 could be removed from the connector 57 and withdrawn from the hitch 15 and tow bar 47.

Obviously, many modifications and variations of the present invention are possible in light of the above teaching. It is therefore to be understood that, within the scope of the appended claims, the invention may be practiced otherwise than as specifically described.

We claim:

1. An automatic hitch device for use on a prime mover with a three-point hitch and drawbar comprising:
   (a) a transverse member;
   (b) tongue accepting means for accepting the tongue of a tow vehicle operably mounted on said transverse member;
   (c) tower means mounted on said transverse member;
   (d) hitch pin driving means operably mounted on said tower;
   (e) hitch pin means operably mounted on said hitch pin driving means for pinning the tongue of a tow vehicle to said tongue accepting means;
   (f) drawbar attachment means mounted on said transverse member for attaching said automatic hitch device to the drawbar of a prime mover; and
   (g) control means for operating said hitch pin driving means,
   (h) said transverse member comprising transverse member attachment means for pivotally attaching said transverse member to two points of a three-point hitch,
   (i) said tower means comprising tower attachment means for pivotally attaching said tower to the third point of a three-point hitch,
   (j) a tongue safety device for retaining the tongue of the tow vehicle on the tongue accepting means,
   (k) the tongue safety device comprising a clevis pivotally mounted above said tongue engagement means and a clevis engagement piece fixedly mounted on the tow vehicle tongue, and
   (l) said tongue safety device comprising a first trip means for disengaging said clevis from said clevis engagement piece.

2. The automatic hitch device of claim 1 wherein said first trip means is actuated by displacement of said automatic hitch device with respect to the prime mover drawbar.

3. The automatic hitch device of claim 2 wherein the first trip means comprises a first trip member pivotally attached to said tower and slidingly engaging the prime mover drawbar, and linkage means operably attached to said first trip member and said clevis.

4. The automatic hitch device of claim 1 wherein said hitch pin driving means comprising a hydraulic cylinder means wherein said hydraulic cylinder means comprises a cylinder and a cylinder rod, and wherein said hitch pin means comprises a hitch pin and a hitch pin alignment means for aligning said hitch pin with the pin hole of a tow vehicle tongue.

5. The automatic hitch device of claim 4 wherein said alignment means comprises an elongate spring mounted between said hitch pin and said cylinder rod coaxial with both said hitch pin and said cylinder rod.

6. An automatic hitch device for use on a prime mover with a three-point hitch and drawbar comprising:
   (a) a transverse member;
   (b) tongue accepting means for accepting the tongue of a tow vehicle operably mounted on said transverse member;
   (c) tower means mounted on said transverse member;
   (d) hitch pin driving means operably mounted on said tower;
   (e) hitch pin means operably mounted on said hitch pin driving means for pinning the tongue of a tow vehicle to said tongue accepting means;
   (f) drawbar attachment means mounted on said transverse member for attaching said automatic hitch device to the drawbar of a prime mover; and
   (g) control means for operating said hitch pin driving means,
   (h) said transverse member comprising transverse member attachment means for pivotally attaching said transverse member to two points of a three-point hitch,
   (i) said tower means comprising tower attachment means for pivotally attaching said tower to the third point of a three-point hitch,
   (j) a drawbar safety device for retaining said automatic hitch device on said drawbar,
   (k) said drawbar attachment means comprising an elongate horizontal bar with an upper surface and a lower surface, said elongate horizontal bar being fixedly attached to said transverse member, and a verticle spike mounted on said upper surface of said horizontal bar for engaging a hole in the prime mover drawbar wherein said drawbar attachment means is positioned below said drawbar,
   (l) said drawbar safety device comprising a tab retractably mounted on said transverse member and selectively positionable immediately above said prime mover drawbar whereby vertical movement of said drawbar attachment means with respect to said drawbar is restricted.

7. The automatic hitch device of claim 6 wherein said drawbar safety device comprises a tab lever pivotally mounted on said transverse member and operably attached to said tab whereby pivotal movement of said tab lever produces pivotal movement of said tab.

8. The automatic hitch device of claim 7 wherein said tab lever is actuated by displacement of said hitch pin means.

9. An automatic hitch device for use on a prime mover with a three-point hitch and drawbar comprising:
   (a) a tranverse member;
   (b) tongue accepting means for accepting the tongue of a tow vehicle operably mounted on said transverse member;
   (c) tower means mounted on said transverse member;
   (d) hitch pin driving means operably mounted on said tower;
   (e) hitch pin means operably mounted on said hitch pin driving means for pinning the tongue of a tow vehicle to said tongue accepting means;
   (f) drawbar attachment means mounted on said transverse member for attaching said automatic hitch device to the drawbar of a prime mover; and
   (g) control means for operating said hitch pin driving means,
   (h) said transverse member comprising transverse member attachment means for pivotally attaching said transverse member to two points of a three-point hitch,
   (i) said tower means comprising tower attachment means for pivotally attaching said tower to the third point of a three-point hitch,
   (j) said automatic hitch device further comprising:
      (1) drawbar safety device means for retaining said automatic hitch device on said drawbar,
      (2) tongue safety device means for retaining the tongue accepting means,
      (3) hitch pin alignment means aligning said hitch pin means with the pin hole of a tow vehicle tongue,
      (4) said tongue safety device being disengaged by lowering of said automatic hitch device with respect to the prime mover drawbar.

10. The automatic hitch device of claim 9 wherein said drawbar safety device means is disengaged by the retraction of said hitch pins means.

11. The automatic hitch device of claim 10 wherein said drawbar safety device and said tongue safety device are manually disengageable.

* * * * *